(12) United States Patent
Engelhardt

(10) Patent No.: US 11,294,109 B2
(45) Date of Patent: Apr. 5, 2022

(54) SEGMENTED BIREFRINGENT CHROMATIC BEAM SHAPING DEVICE

(71) Applicant: Deutsches Krebsforschungszentrum, Heidelberg (DE)

(72) Inventor: Johann Engelhardt, Bad Schoenborn (DE)

(73) Assignee: DEUTSCHES KREBSFORSCHUNGSZENTRUM, Heidelberg (DE)

( * ) Notice: Subject to any disclaimer, the term of this patent is extended or adjusted under 35 U.S.C. 154(b) by 240 days.

(21) Appl. No.: 16/430,948

(22) Filed: Jun. 4, 2019

(65) Prior Publication Data

US 2019/0302331 A1 Oct. 3, 2019

Related U.S. Application Data

(63) Continuation of application No. PCT/EP2017/080800, filed on Nov. 29, 2017.

(30) Foreign Application Priority Data

Dec. 5, 2016 (EP) .................................. 16202295

(51) Int. Cl.
*G02B 5/18* (2006.01)
*G02B 27/10* (2006.01)
(Continued)

(52) U.S. Cl.
CPC ....... *G02B 5/1833* (2013.01); *G01N 21/6458* (2013.01); *G02B 5/3083* (2013.01);
(Continued)

(58) Field of Classification Search
CPC ... G02B 5/00; G02B 5/18; G02B 5/30; G02B 5/3083; G02B 21/00; G02B 21/0072;
(Continued)

(56) References Cited

U.S. PATENT DOCUMENTS 8,586,945 B2 11/2013 Reuss et al.
2005/0195480 A1* 9/2005 Brown ............... G02B 21/0092
359/489.07
(Continued)

FOREIGN PATENT DOCUMENTS

WO 2010/133678 A1 11/2010

OTHER PUBLICATIONS

D. Wildanger et al.: "A STED microscope aligned by design", Opt. Exp. 17 (18), 16100-16110 (2009).
(Continued)

*Primary Examiner* — Jie Lei
(74) *Attorney, Agent, or Firm* — Thomas | Horstemeyer, LLP

(57) ABSTRACT

A segmented birefringent chromatic beam shaping device comprises at least three birefringent chromatic segments arranged side by side in a pupil of the beam shaping device. The birefringent chromatic segments are essentially $n\lambda$ waveplates at a first design wavelength. At a second design wavelength, the birefringent chromatic segments are essentially $(m+1/2)\lambda$ waveplates. Each of the birefringent chromatic segments comprises a stack of birefringent elements including at least three chromatic birefringent elements. Orientations of fast axes of each pair of directly consecutive chromatic birefringent elements of each of the birefringent chromatic segments differ by at least 5 deg. The at least three birefringent chromatic segments comprise same sequences of materials, thicknesses and orientations of their birefringent elements so that they only differ is their orientations in the pupil.

19 Claims, 6 Drawing Sheets

(51) Int. Cl.
   *G02B 5/30* (2006.01)
   *G02B 21/00* (2006.01)
   *G01N 21/64* (2006.01)
(52) U.S. Cl.
   CPC ..... *G02B 21/0032* (2013.01); *G02B 21/0068* (2013.01); *G02B 21/0072* (2013.01); *G02B 21/0076* (2013.01); *G02B 27/1006* (2013.01)
(58) Field of Classification Search
   CPC ............ G02B 21/0032; G02B 21/0068; G02B 21/0076; G02B 27/10; G02B 27/1006; G02B 5/1833; G01N 21/6458; G01N 21/64; G01J 1/58; H01J 27/24
   USPC ............ 359/489.01, 489.06, 489.07, 189.11, 359/189.15, 489.16, 494
   See application file for complete search history.

(56) References Cited

U.S. PATENT DOCUMENTS

2012/0104279 A1* 5/2012 Reuss ................ G02B 21/0068
                                                        250/458.1
2013/0299716 A1   11/2013 Song et al.

OTHER PUBLICATIONS

S. Pancharatnam: "Achromatic combinations of birefringent plates", Part I. An achromatic circular polarizer, Proc. Indian Acad. Sci. 41a (1955), 130-136.
A. Saha et al.: "Achromatic half-wave combination of birefringent plates", Optic 125 (2014), 4534-4537.
M. Reuss et al.: "Birefringent device converts a standard scanning microscope into a STED microscope that also maps molecular orientation", Optics Express, Optical Society of America, vol. 18, No. 2, Jan. 18, 2010, pp. 1049-1058, XP002592880.
G. Machavariani et al.: "Efficient extracavity generation of radially and azimuthally polarized beams", Optics Letters, Optical Society of America, vol. 32, No. 11, Jun. 1, 2007, pp. 1468-1470, XP001542948.
J. M. Herrera-Fernandez et al.: "Design of superachromatic quarter-wave retarders in a broad spectral range", Applied Optics, vol. 54, No. 33, Nov. 20, 2015, p. 9758, XP055370717.
J. L. Vilas et al.: "Optimal achromatic wave retarders using two birefringent wave plates", Applied Optics, Optical Society of Amercia, vol. 52, No. 9, Mar. 20, 2013, pp. 1892-1896, XP001580945.

* cited by examiner

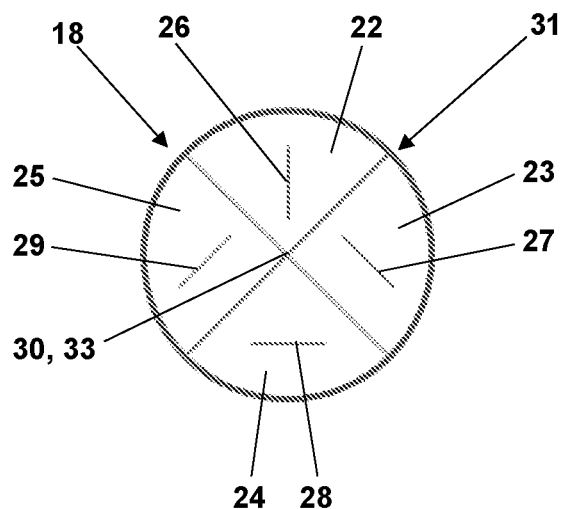
Fig. 2
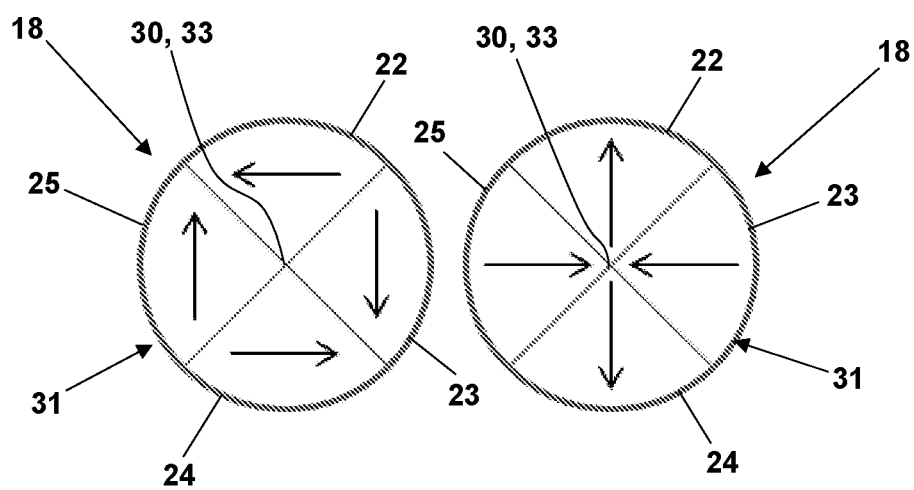
Fig. 3A  Fig. 3B

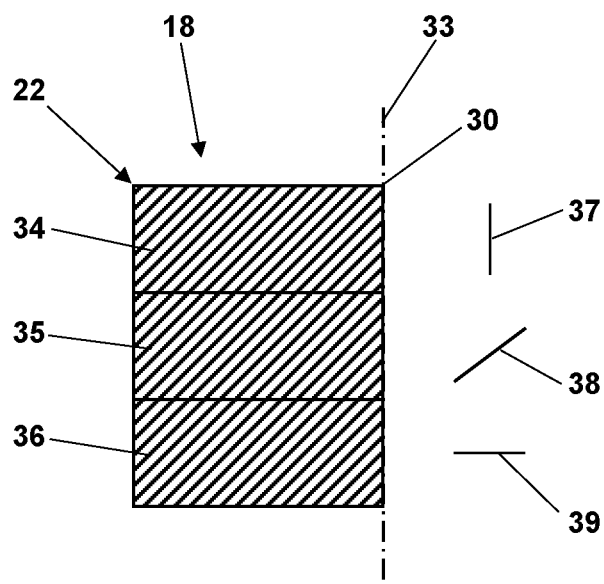
Fig. 4A          Fig. 4B
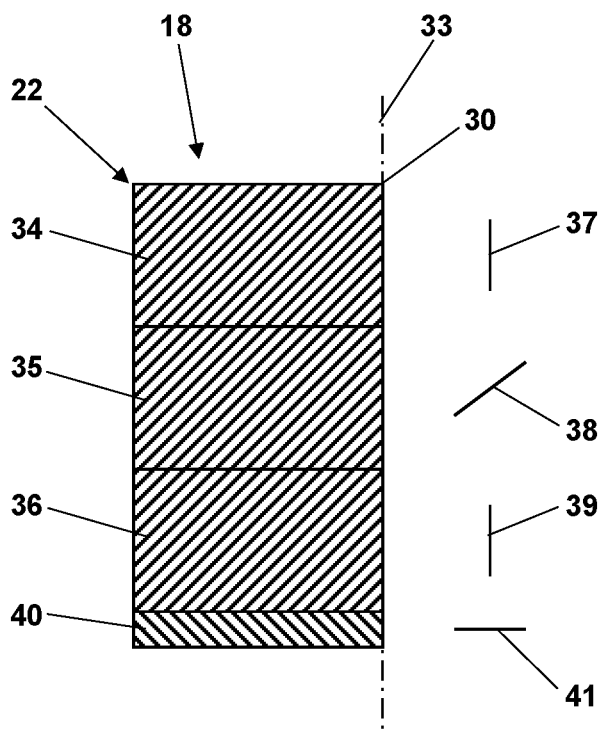
Fig. 5A    Fig. 5B

SEGMENTED BIREFRINGENT CHROMATIC BEAM SHAPING DEVICE

CROSS REFERENCE TO RELATED APPLICATIONS

This application is a continuation to International Application PCT/EP2017/080800 with an international filing date of Nov. 29, 2017 entitled "Segmented birefringent chromatic beam shaping device" and claiming priority to European Patent Application No. EP 16 202 295.8 also entitled "Segmented birefringent chromatic beam shaping device", filed on Dec. 5, 2016, and now abandoned.

FIELD OF THE INVENTION

The present invention relates to a segmented birefringent chromatic beam shaping device (SBCBSD). More particularly, the present invention relates to a SBCBSD comprising birefringent chromatic segments (BCSs) arranged side by side in a pupil of the SBCBSD.

Such a SBCBSD may be used in fluorescence laser scanning microscopy. More particular, such a SBCBSD may be used in a STED microscope or any other RESOLFT type microscope for implementing the so-called easySTED concept.

Further, such a SBCBSD may be used in MINFLUX type microscopy.

BACKGROUND OF THE INVENTION

According to the easySTED concept, both a beam of excitation light and a beam of fluorescence inhibition light pass through a same chromatic beam shaping device. Due to the chromatic properties of the chromatic beam shaping device, it leaves the beam of excitation light essentially untouched, whereas it shapes the beam of fluorescence inhibition light in such a way that, when focusing the beams of excitation light and inhibition light into a same focal area, the intensity distribution of the fluorescence inhibition light displays a local intensity minimum, preferably a zero point, coinciding with a maximum of the intensity of the excitation light at the center of the focal area.

In MINFLUX type microscopy, see F. Balzarottie et al., Nanometer resolution imaging and tracking of fluorescent molecules with minimal photon fluxes, arXiv:1611.03401 [physics.optics], a SBCBSD may shape a beam of excitation light in such a way that, when focusing the beam of excitation light, the intensity distribution of the excitation light displays a local intensity minimum, preferably a zero point, at the center of the focal area, whereas it leaves fluorescence light which is emitted out of the focal area essentially untouched.

PRIOR ART

International application publication WO 2010/133678 A1 discloses a SBCBSD for implementing the easySTED concept in an STED microscope or any other RESOLFT microscope. The SBCBSD modifies the polarization distribution of a beam of fluorescence inhibition light over its cross section. For this purpose, the SBCBSD comprises segments of a birefringent chromatic plate that is a $\lambda/2$ waveplate at the wavelength of the fluorescence inhibition light but does not change the polarization at the wavelength of the excitation light. The segments of the birefringent chromatic waveplate are pie segments tapering towards a common optical axis of the SBCBSD and feature different orientations of their fast axes. Particularly, there are four pie segments of a same size and of a difference in orientation of their fast axes of 45° from pie segment to pie segment around the common optical axis. This SBCBSD may be combined with a non-segmented achromatic $\lambda/2$ waveplate at its output side or with an achromatic $\lambda/4$ waveplate at its input side or both, the achromatic $\lambda/4$ waveplate serving for circularly polarizing incoming linearly polarized excitation and fluorescence inhibition light.

Further, WO 2010/133678 A1 discloses a stack of differently segmented birefringent chromatic waveplates for polarizing a beam of fluorescence inhibition light differently in eight different areas of its cross-section although each of the segmented birefringent chromatic waveplates only has two, three or four segments.

The chromatic properties of all the segmented birefringent chromatic beam shaping devices known from WO 2010/133678 A1 have to be exactly adapted to the wavelengths of the fluorescence inhibition light and the excitation light to shape the beam of fluorescence inhibition light as desired and to leave the beam of excitation light untouched.

D. Wildanger et al., "A STED Microscope Aligned by Design", Opt. Exp. 17 (18), 16100-16110 (2009) disclose another segmented chromatic beam shaping device for implementing the easySTED concept. Their segmented chromatic beam shaping device consists of six segments arranged around an optical axis. The six segments do not polarize a beam of excitation light differently. Instead, the wavefronts of the fluorescence inhibition light are delayed differently by the different segments, whereas the entire wavefronts of the excitation light remain plane. For this purpose, each of the six segments is made of two optical flats of materials whose refractive indices are equal at the excitation wavelength but notably differ at the fluorescence inhibition wavelength. With equal thicknesses of all pairs of optical flats stacked along the optical axis, the phase shifts introduced at the excitation wavelength are the same for all pairs, whereas the phase shifts introduced at the fluorescence inhibition wavelength are a function of the diffraction index difference between the two optical flats of each pair of the STED wavelength and of the thicknesses of the two optical flats in each pair.

This non-birefringent segmented chromatic beam shaping device has also to be carefully adapted to both the wavelength of the fluorescence inhibition light and the wavelength of the excitation light to work properly.

S. Pancharatnam, "Achromatic combinations of birefringent plates", Part I. An achromatic circular polarizer, Proc. Indian Acad. Sci. 41a (1955), 130-136 discloses an birefringent chromatic polarizer consisting of a stack of three chromatic birefringent elements. The three elements are all of the same material and arranged at selected angles between their fast axes. The known achromatic circular polarizer is usable as a $\lambda/4$ waveplate over an extended range of wavelengths as compared to a $\lambda/4$ waveplate only consisting of a single birefringent element.

A. Saha et al., "Achromatic half-wave combination of birefringent plates", Optic 125 (2014), 4534-4537 disclose an achromatic $\lambda/2$ waveplate consisting of a stack of three chromatic birefringent elements arranged at selected angles of their fast axes. Particularly, the three chromatic birefringent elements are all $\lambda/2$ plates at 600 nm, and they are arranged at different angles of their fast axes. The resulting device is a $\lambda/2$ waveplate which is achromatic over a wavelength range from 500 to 750 nm.

There still is a need of a SBCBSD which is capable of leaving a polarization of light of one wavelength essentially unaffected whereas it purposefully shapes a polarization distribution of light of another wavelength and which is usable over an increased range of wavelengths of at least one of the one and the other wavelengths.

SUMMARY OF THE INVENTION

The present invention relates to a segmented birefringent chromatic beam shaping device (SBCBSD). The SBCBSD comprises a pupil and at least three birefringent chromatic segments arranged side by side in the pupil. Birefringent and chromatic properties of the beam shaping device are invariant over each birefringent chromatic segment of the at least three birefringent chromatic segments. The at least three birefringent chromatic segments are $(n+s)\lambda$ waveplates at a first design wavelength, n being an integer greater than 0, and s being in a range from $-0.1$ to $0.1$. n is identical or not identical with all of the at least three birefringent chromatic segments. At least two of the at least three birefringent chromatic segments are $(m+r)\lambda$ waveplates at a second design wavelength, m being an integer greater than 0, and r being in a range from $0.4$ to $0.6$. The at least two of the at least three birefringent chromatic segments only differ is their orientations and, optionally, in their shapes in the pupil. Each of the at least three birefringent chromatic segments comprises a stack of birefringent elements including at least three chromatic birefringent elements. Orientations of fast axes of each pair of directly consecutive chromatic birefringent elements of the at least three chromatic birefringent elements of each of the at least three birefringent chromatic segments differ by at least 5 deg. All of the at least two of the at least three birefringent chromatic segments comprise same sequences of materials, thicknesses and orientations of their birefringent elements.

Further, the present invention relates to a RESOLFT fluorescence light microscope. The RESOLFT fluorescence light microscope comprises an excitation light source providing excitation light, a fluorescence inhibition light source providing fluorescence inhibition light, an objective lens focusing both the excitation light and the fluorescence inhibition light into a common focal area, and a birefringent chromatic beam shaping device (SBCBSD) as defined above. Beam paths of the excitation light and the fluorescence inhibition light are merged upstream the objective lens; and the SBCBSD is arranged in the merged beam paths of the excitation light and the fluorescence inhibition light.

Further, the present invention relates to a MINFLUX fluorescence light microscope. The MINFLUX fluorescence light microscope comprises an excitation light source providing excitation light, a beam shaping device shaping the excitation light, an objective lens focusing the excitation light into a focal area and a detector detecting fluorescence light emitted out of the focal area. The beam shaping device shaping the excitation light such that an intensity distribution of the focused excitation light displays a local intensity minimum at a center of the focal area is a birefringent chromatic beam shaping device (SBCBSD) as defined above.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

FIG. 2 is a front view of an embodiment of the SBCBSD according to the present disclosure.

FIG. 3A shows the polarization distribution of light of a second design wavelength which has passed through the SBCBSD according to FIG. 2, for horizontally polarized incident light, and FIG. 3B shows the polarization distribution of light of a second design wavelength which has passed through the SBCBSD according to FIG. 2, for vertically polarized incident light.

FIG. 4A shows a cross section of a segment of one embodiment of the SBCBSD according to the present disclosure, comprising three chromatic birefringent elements (CBEs), the viewing plane extending along the optical axis, and FIG. 4B shows the orientations of the fast axes of the three CBEs according to FIG. 4A with a viewing direction along the optical axis.

FIG. 5A shows a cross section of a segment of another embodiment of the SBCBSD according to the present disclosure, comprising three CBEs and a further birefringent achromatic element, the viewing plane extending along the optical axis, and FIG. 5B shows the orientations of the fast axes of the birefringent elements according to FIG. 5A with a viewing direction along the optical axis.

DETAILED DESCRIPTION

Figure 1:
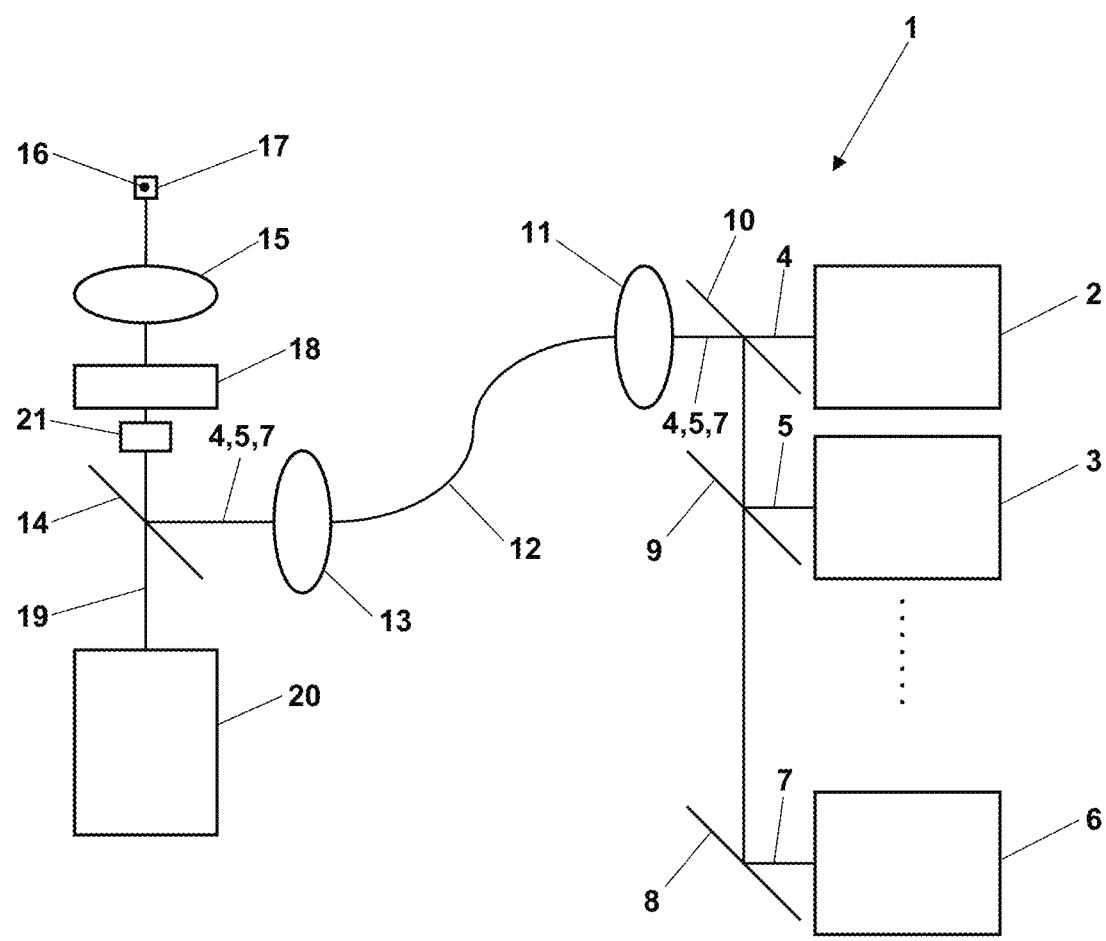
FIG. 1 schematically illustrates an RESOLFT microscope comprising a segmented birefringent chromatic beam shaping device (SBCBSD) according to the present disclosure and a plurality of light sources.

A SBCBSD according to the present disclosure comprises at least three birefringent chromatic segments (BCSs) arranged side by side in a pupil. Here, the term "pupil" refers to the pupil of the SBCBSD, i.e. the working area of the SBCBSD through which beams to be shaped by the SBCBSD may pass.

Over each of the at least three BCSs, birefringent and chromatic properties of the SBCBSD are invariant or constant.

At a first design wavelength, the at least three BCSs are $(n+s)\lambda$ waveplates. n is an integer greater than 0, and s is in a range from −0.1 to 0.1. Thus, the at least three BCSs are essentially $n\lambda$ waveplates at the first design wavelength. Further, n may be identical or not identical with all of the at least three BCSs. When the SBCBSD according to the present disclosure is used to implement the easySTED concept, the first design wavelength will typically be a wavelength of excitation light to be actually used or some kind of an average of a plurality of wavelengths of excitation light to be actually used. Thus, the first design wavelength may differ from all wavelengths of the excitation light with which the SBCBSD according to the present disclosure will actually be used.

At a second design wavelength, at least two of the at least three BCSs are $(m+r)\lambda$ waveplates. m is an integer greater than 0 which identical with all of the at least two of the at least three BCSs, and r is in a range from 0.4 to 0.6. Thus, the at least two of the at least three BCSs are essentially $(m+1/2)\lambda$ waveplates at the second design wavelength. When implementing the easySTED concept, the second design wavelength may be the wavelength of fluorescence inhibition light to be actually used or some kind of an average of a plurality of wavelengths of fluorescence inhibition light to be actually used. Thus, the second design wavelength may differ from all wavelengths of the fluorescence inhibition light with which the SBCBSD according to the present disclosure will actually be used.

The at least two of the at least three BCSs only differ in their orientations and, optionally, in their shapes in the pupil of the SBCBSD. This means that they are optically identical but that they may be cut to different shapes with regard to the orientation of their respective effective fast axis at the second design wavelength.

According to the present disclosure, each of the at least three BCSs comprises a stack of birefringent elements including at least three chromatic birefringent elements (CBEs). Orientations of the fast axes of each pair of directly consecutive CBEs of each of the at least three BCSs differ by at least 5 deg. Here, "pair of directly consecutive CBEs" means that each pair consists of two CBEs following to each other in the stack without any further CBE being arranged in between. The minimum difference in orientation of 5 deg between the fast axes of the two CBEs of each of the pairs ensures that the fast axes do not point in the same direction. If the fast axes would point in the same direction, the respective pair of CBEs would have the same properties as a single CBE and would only contribute this single CBE to the minimum number of three CBEs per stack. The same effect occurs at a difference in orientation of 90 deg between the fast axes of the two chromatic birefringent elements of each pair of CBEs, i.e. with a difference in orientation of 90 deg between their fast axes two CBEs have the same properties as a single chromatic birefringent element. Thus, they do not contribute two but they only contribute one CBE to the minimum number of three CBEs per BCS.

In the SBCBSD according to the present disclosure, the at least two of the at least three BCSs comprise same sequences of materials, thicknesses and orientations of all their birefringent elements, i.e. they essentially only differ in their orientations in the pupil of the SBCBSD.

By means of the at least three CBEs per BCS, the range of wavelengths around the first design wavelength over which the three segments are essentially $n\lambda$ waveplates and the range of wavelengths around the second design wavelength over which the at least two of the at least three segments are essentially $(m+1/2)\lambda$ waveplates may be increased considerably. The actual increase depends on the differences in orientations of the CBEs. Particularly, the range of wavelengths over which the three segments are essentially $n\lambda$ waveplates so that the SBCBSD essentially has no effect on the polarization of the incident light may be extended considerably as compared to known SBCBSDs applying the easySTED concept. This means, that the SBCBSD according to the present disclosure does not use the concept of Pancharatnam or Saha et al. of increasing the range of wavelengths at which the SBCBSD actually changes the polarization of the incident light. Instead, it increases the range of wavelengths at which the SBCBSD leaves the polarization distribution of the incident light untouched.

The first and second design wavelengths at which the BCSs of the SBCBSD according to the present disclosure are essentially $n\lambda$ waveplates and $(m+1/2)\lambda$ waveplates, respectively, may be adapted to the intended use of the SBCBSD. However, the SBCBSD according to the present disclosure is not only usable with a first beam of light having the first design wavelength and a second beam of light having the second design wavelength. Instead, the SBCBSD according to the present disclosure is usable over an extended range of wavelengths of at least one of the first and the second beam of light. Particularly, at least the first wavelength of the first beam of light may strongly differ from the first design wavelength but the polarization of the first beam of light may nevertheless essentially remain unaffected when passing through the SBCBSD according to the present disclosure. Remaining essentially unaffected means that the first beam of light—when focused into a focal area behind the SBCBSD displays an intensity maximum at the center of the focal area. On the other hand, the polarization distribution of the second beam of light is purposefully affected by the SBCBSD according to the present disclosure. Particularly, its polarization distribution is shaped in such a way that the second beam of light—when focused into a focal area behind the beam shaping device—displays an intensity minimum at the center of the focal area. This local intensity minimum may essentially be a zero point of the intensity of the light of the second wavelength. To achieve such a local intensity minimum at the center of the focal area the SBCBSD has to have at least three BCSs.

The SBCBSD may comprise at least two pairs of BCSs, wherein the two BCSs of each of the at least two pairs of BCSs comprise same sequences of materials, thicknesses and orientations of their at least three CBEs. Further, the two BCSs of each of the at least two pairs of BCSs are located on opposite sides of a center of the pupil of the SBCBSD or an optical axis passing through the center of the pupil of the SBCBSD.

A total number of the at least three BCSs of the SBCBSD according to the present disclosure may actually be an even number so that the at least three BCSs may consist of pairs of BCSs located on opposite sides of the center of the pupil of the SBCBSD. With regard to the desired zero point of the intensity distribution of the light of the second wavelength—when focused behind the beam shaping device—, a suitable result is achieved with two pairs of BCSs, i.e. with a total of four BCSs. However, an intensity distribution of the light of the second wavelength in which the intensity more uniformly increasing in all directions from the center of the focal area is achieved with three pairs of BCSs, i.e. with a total of six BCSs. The uniformity of the increase of the intensity of the light of the second wavelength in all directions from the center point of the focal area may be further increased by further increasing the number of BCSs. The increase in uniformity with a total of eight or more BCSs, however, is only small so that a total of six BCSs may be regarded as an optimum with regard to both result and efficiency.

The at least three BCSs may be evenly distributed around the center of the pupil of the SBCBSD, and the at least three BCSs may particularly be pie segments tapering towards the center of the pupil of the SBCBSD.

Not only the two BCSs of each pair of BCSs but all of the at least three BCSs may comprise same sequences of materials, thicknesses and orientations of their birefringent elements. This means that the SBCBSD according to the present disclosure may be manufactured by forming a stack of larger chromatic birefringent elements and cutting this stack into the BCSs, and by arranging these BCSs in the pupil of the SBCBSD with their effective fast axes being oriented as desired. Generally, however, the BCSs of different pairs of BCSs of the SBCBSD according to the present disclosure may be separately manufactured from different larger chromatic birefringent elements. Even in this case, not only two but all BCSs may be essentially $(m+1/2)\lambda$ waveplates at the second design wavelength.

If the orientations of the effective fast axes of the essentially $(m+1/2)\lambda$ waveplates at the second design wavelength rotate from BCS to BCS at an opposite sense of rotation as compared to a sense of rotation at which the respective BCSs are arranged around a center of the pupil of the SBCBSD, the intensity distribution of light of the second wavelength entering the SBCBSD with circular polarization and focused behind the beam shaping device will have no preferred directions of polarization in the focal area so that the light of the second wavelength acts upon molecules being optical dipoles, i.e. inhibits these molecules from emitting fluorescence light, for example, independently on the actual directions of orientations of their dipoles.

If an even number of BCSs are arranged with their orientations as described in the previous paragraph, any two BCSs which are located on opposite sides of the center of the pupil of the SBCBSD have orthogonal effective fast axes as the essentially $(m+1/2)\lambda$ waveplates at the second design wavelength.

Particularly, the at least three CBEs of each of the at least three BCSs of the SBCBSD according to the present disclosure may be selected from $t\lambda$ and $(t+1/2)\lambda$ waveplates at the second design wavelength. Here, t is an integer which may be identical in all of the three BCSs or not.

The ranges of the first and second wavelengths over which the BCSs of the SBCBSD are essentially $n\lambda$ waveplates and $(m+1/2)\lambda$ waveplates, respectively, may be varied by varying the differences of the orientations of the fast axes between the at least three CBEs. Thus, the dispersive characteristic of the SBCBSD according to the present disclosure may be tuned without varying the material or design of the CBEs.

The differences of the orientations of the fast axes of each pair of directly consecutive CBEs of the at least three CBEs of each of the at least three BCSs may particularly be at least 10 deg, and, optionally, about 45 deg. A small deviation from 45 deg of up to a few deg may, however, purposefully be used to fine-tune the dispersive behavior of the SBCBSD according to the present disclosure. If a difference of the orientations of the fast axes of a pair of directly consecutive BCSs is indicated here, this difference does not indicate an absolute orientation of the BCSs. Thus, a difference of 45 deg is both achieved with absolute orientations of 0° and 45°, and 90° and 45° of two consecutive BCSs, for example.

All birefringent elements of each BCSs of the at least three BCSs may have a minimum thickness of 0.1 mm and a maximum thickness of 25 mm. Suitable waveplates of such thicknesses are commercially available. Further, the thicknesses of the birefringent elements may range from 1 to 10 mm, so that the birefringent elements can be handled easily and nevertheless result in a suitable overall thickness of the segments and the entire SBCBSD.

As already pointed out, all BCSs may be made of same larger birefringent elements. Further, two, three or all of the birefringent elements of all BCSs may be made of the same material, have the same thicknesses or both. Thus, only very few or even only one starting material may be needed to implement the present disclosure. This starting material may be a single plate which is first cut into larger elements. These larger elements are then stacked with different orientations of their fast axes. Next, the resulting stack is cut into the BCSs which are rearranged with different orientations of their effective fast axes in the pupil of the SBCBSD according to the present disclosure.

For example, the at least three BCSs may consist of three chromatic $2.5\lambda$ waveplates at the second design wavelength whose fast axes are oriented at absolute angles of about 0°, 45° and 90°.

In another particular embodiment of the SBCBSD according to the present disclosure, the at least three CBEs of each of the at least three BCSs provide a $p\lambda$ waveplate at the second design wavelength, and each of the at least three BCSs comprises a further achromatic $(q+1/2)\lambda$ waveplate, p and q being integers. This embodiment of the SBCBSD according to the present disclosure may be described as an inversion of the achromatic half-wave combination of birefringent plates known from Saha et al. by means of the additional achromatic $\lambda/2$ waveplate. In this inversion the SBCBSD is not an $(m+1/2)\lambda$ waveplate but an $n\lambda$ waveplate over the extended range of wavelengths. The absolute angle of orientation of the achromatic $\lambda/2$ waveplate is irrelevant as long as it is the same with regard to the CBEs in all BCSs.

In a particular variant of this embodiment of the invention, each of the at least three BCSs consists of three chromatic $2\lambda$ waveplates at the second design wavelength, whose fast axes are oriented at absolute angles of 0°, 45° and 0°, and an achromatic $\lambda/2$ waveplate.

The SBCBSD according to the present disclosure may easily be made such that the at least three BCSs are $(n+x)\lambda$ waveplates in a wavelength range including the first design wavelength, whereas x is an a range from −0.2 to 0.2, and the wavelength range extends over at least 10%, at least 15% or even more of the first design wavelength. This may even be achieved with the first design wavelength and the second design wavelength differing by not more than 15% or even by not more than 10% of the first design wavelength. Such a small difference between the first and the second design wavelength allows to use the SBCBSD according to the present disclosure for implementing the easySTED concept with small differences in wavelengths between the second wavelength of the fluorescence inhibition light and the range of possible first wavelengths of the excitation light.

In a RESOLFT fluorescence light microscope according to the present disclosure and comprising an excitation light source providing excitation light and an fluorescence inhibition light source providing fluorescence inhibition light, wherein beam paths of the excitation light and the fluorescence inhibition light are merged upstream of an objective lens focusing both the excitation light and the fluorescence inhibition light into a common focal area, and wherein a SBCBSD is arranged in the merged beam paths of the excitation light and the stimulation light, the SBCBSD is the SBCBSD according to the present disclosure. Optionally, this SBCBSD is also arranged in a beam path of fluorescence light extending from the focal area to a fluorescence light detector. This is particularly possible as the range of the wavelengths at which light is left unaffected with regard to its polarization distribution by the beam shaping device according to the present disclosure is large enough to also cover the wavelength of the fluorescence light.

The RESOLFT fluorescence light microscope according to the present disclosure may be a STED fluorescence light microscope in which the fluorescence inhibiting light source is a STED light source and provides STED or stimulation light.

In a MINFLUX fluorescence light microscope according to the present disclosure and comprising an excitation light source providing excitation light, which is shaped by a beam shaping device and focused by an objective lens into a focal area such that an intensity distribution of the excitation light displays a local intensity minimum in the focal area, and a detector detecting fluorescence light emitted out of the focal area, the SBCBSD is t the SBCBSD according to the present disclosure, and the SBCBSD is also arranged in a beam path of the fluorescence light from the focal area to the detector.

Further details of a fluorescence laser scanning microscope and of fluorescence laser scanning microscopy in which the invention may be used can be taken from James B. Pawley: "Handbook of Biological Confocal Microscopy" 3rd Edition, Springer Verlag, ISBN 10. 0-387-25921-X, ISBN 13: 987-0387-25921-5, which is incorporated herein by reference. We explicitly assume that the teaching of this handbook is known by any person of ordinary skill in the technical field of the present disclosure.

Now referring in greater detail to the drawings, the RESOLFT microscope 1 depicted in FIG. 1 may, for example, be an STED microscope. It may, however, also implement other RESOLFT or MINFLUX techniques. The RESOLFT microscope 1 comprises a number of excitation light sources 2, 3 providing beams 4, 5 of excitation light of different wavelengths, and a fluorescence inhibition light source 6 providing a beam 7 of fluorescence inhibition light of another wavelength. Typically, the light sources 2, 3 and 6 are lasers. The beams 4, 5 and 7 are merged by means of a mirror 8 and two dichroic mirrors 9 and 10. By means of a lens 11, the merged light beams 4, 5, 7 are coupled into a single mode fiber 12. The fiber output combined with a further lens 13 puts out the beams 4, 5, 7 towards a dichroic beam splitter 14. The beam splitter 14 deflects the beams 4, 5, 7 towards an objective lens 15 focusing the beams into a common focal area 16 within a sample 17. A chromatic beam shaping device 18 according to the present disclosure is located within or close enough to an entry pupil of the objective lens 15 or between the objective lens 15 and the sample 17. Fluorescence light 19 emitted out of the sample 17 is detected with a detector 20 arranged behind the beam splitter 14. Thus, the fluorescence light 19 also passes through the chromatic beam shaping device 18. Further, a scanner 21 deflects the beams 4, 5, 7 to scan the sample 17 with the focal area 16 and to de-scan the fluorescence light 19 so that the detector 20 is always confocally arranged with regard to the focal area 16. Alternatively the chromatic beam shaping device 18 may be placed between the collimation lens 13 and the beam splitter 14.

The chromatic beam shaping device 18 shapes the beam 7 of the fluorescence inhibition light such that an intensity distribution of the fluorescence inhibition light shows a local minimum or zero point at the center of the focal area 16. On the other hand, the beam shaping device 18 leaves the beams 4, 5 unaffected to such an extent that the excitation light of the different wavelengths still displays intensity distributions with a maximum at the center of the focal area 16. To achieve this result, the chromatic beam shaping device 18 affects the polarization distribution of the beam 7 across the pupil of the objective lens 15 whereas it leaves the other beams 4, 5 unaffected due to their wavelengths differing from the wavelength of the fluorescence inhibition light.

The chromatic beam shaping device 18 is a segmented birefringent chromatic beam shaping device (SBCBSD) like that one depicted in FIG. 2. For the wavelength of the fluorescence inhibition light of the beam 7 four birefringent chromatic segments (BCSs) 22 to 25 of the beam shaping device 18 are all $(m+1/2)\lambda$ waveplates with their fast axes 26 to 29 being oriented as depicted. The four BCSs 22 to 25 are all shaped like pie segment. They are all of a same size, and they are all arranged around a center 30 of a pupil 31 of the beam shaping device 18 which may coincide in the microscope 1 with the pupil of the objective lens 15. Further, an optical axis 33 of the beam shaping device 18 passing through the center 30 may coincide with an optical axis 32 of the microscope lens 15. The four BCSs 22 to 25 are arranged in two pairs of BCSs 22 and 24, 23 and 25 opposing each other across the center 30 and displaying orthogonal orientations of their fast axes 26 and 28, 27 and 29, respectively. When looking on the arrangement of the BCSs 22 to 25 around the center 30, the respective next BCS in clockwise direction displays an orientation of its fast axes rotated by 45° in counter-clockwise direction. Thus, for example, the fast axis 26 of the BCS 22 arranged at the twelve o'clock position extends from twelve o'clock to six o'clock, whereas the fast axis 27 of the BCS 23 arranged at the three o'clock position extends from half past ten to half past four.

FIG. 3A shows the resulting polarization distribution of horizontally polarized incident fluorescence inhibition light. If the fluorescence inhibition light with this polarization distribution is focused by means of the objective lens 15, its intensity distribution displays the desired zero point at the center of the focal area 16 according to FIG. 1. The same applies to fluorescence inhibition light which is originally vertically polarized and whose polarizations are affected across the pupil 31 of the beam shaping device as depicted in FIG. 3B. With circularly polarized incident fluorescence inhibition light, the polarization distribution of the fluorescence inhibition light after the beam shaping device 18 periodically changes between the polarization distributions according to FIGS. 3A and 3B so that there is not just the desired zero point of the intensity distribution of the fluorescence inhibition light at the center point of the focal area 16 but also a close to uniform distribution of the fluorescence inhibition light around the center of the focal area 16 for all polarization directions of the fluorescence inhibition light so that it uniformly acts upon all fluorescent molecules outside the center of the focal area 16, independently on the orientations of their optical dipoles.

For achieving this effect on the polarization distribution of the beam 7 of fluorescence inhibition light but for leaving the beams 4 and 5 of excitation light of different wavelengths essentially unaffected, the BCSs 22 to 25 of the beam shaping device 18 do not just comprise a single chromatic birefringent element (CBE) but at least three CBEs each. FIG. 4A is a cross section through one of the BCSs 22 to 25 of one embodiment of the beam shaping device 18 along the optical axis 33 through the center 30 of the beam shaping device 18. In this embodiment, all three CBEs 34 to 36 may be made of a same material, like for example quartz, and they may all be 2.5λ waveplates at the wavelength of the fluorescence inhibition light of the beam 7. The orientations of their optical axes 37 to 39, which are depicted in separate views along the optical axis 33 in FIG. 4B, differ by 45° with each pair of directly consecutive CBEs 34 and 35, and 35 and 36, respectively. The other BCSs 23 to 25 of the beam shaping device 18 differ from the BCS 22 only with regard to the orientation of their resulting fast axes 27 to 29 in the pupil 31. Particularly, all BCSs 22 to 25 may be made from a single quartz plate first cut into three pieces which are then stacked with their optical axes 37 to 39 according to FIG. 4. Next, the BCSs 22 to 25 are cut from this stack and arranged according to FIG. 2.

In the embodiment of the beam shaping device 18 depicted in FIG. 5 in two views similar to the views of FIG. 4, the three CBEs 34 to 36 are 2λ waveplates at the wavelength of the fluorescence inhibition light beam 7 followed by an achromatic λ/2 waveplate as a further birefringent element 40. The fast axes 37 to 39 of the three CBEs 34 to 36 depicted in FIG. 5B are arranged at 0 deg, 45 deg and 0 deg, respectively which also corresponds to differences in orientation of 45° between the directly consecutive birefringent chromatic elements 34 and 35, and 35 and 36, respectively. The orientation of a fast axis 41 of the further birefringent element 40 being an achromatic λ/2 waveplate depicted in FIG. 5B is not relevant. The fast axis 41 may have any orientation with regard to the fast axes 37 to 39. However, this orientation is fixed over all BCSs 22 to 25 which again only differ in the orientations of their effective fast axes at the wavelength of the fluorescence inhibition light in the pupil 31. The embodiment of the beam shaping device 18 according to FIG. 5 may be manufactured in that one plate of the material for the CBEs 34 to 36 is cut into three pieces which are then stacked with their fast axes 37 to 39 orientated as depicted in FIG. 5B. A further plate of the material of the birefringent element 40 is added to the stack. Then the BCSs 22 to 25 are cut from this four-layered stack, and the BCSs 22 to 25 are arranged with their effective fast axes at the wavelength of the fluorescence inhibition light beam as depicted in FIG. 2.

Figure 6:
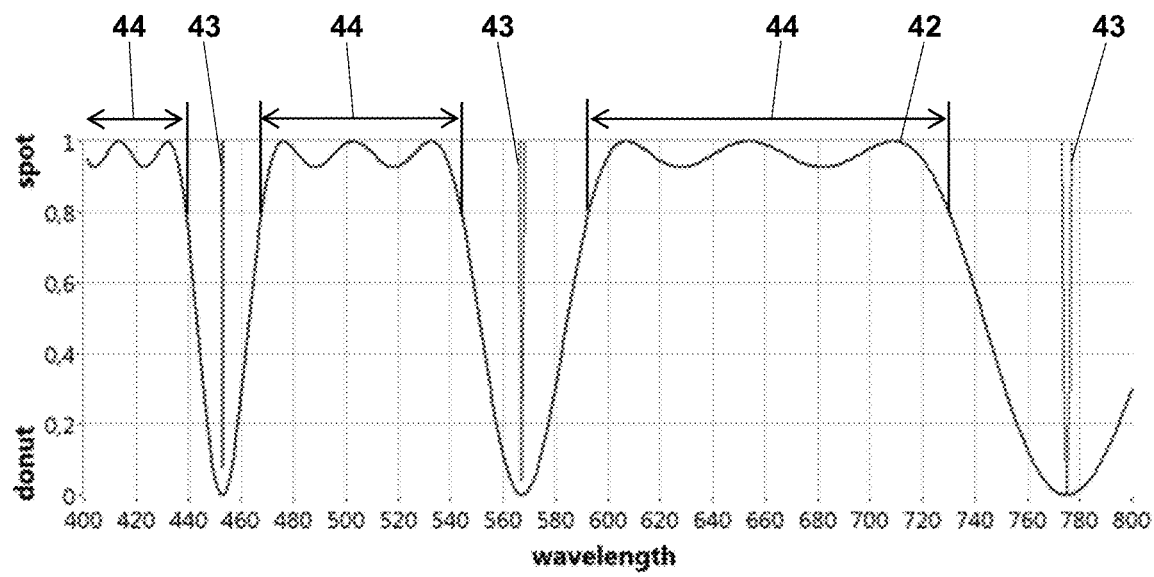
FIG. 6 shows a wide excitation range quality function of the SBCBSD according to FIG. 4.

FIG. 6 is a wide excitation range quality function 42 of the embodiment of the invention according to FIG. 4 adapted to a wavelength of the fluorescence inhibition light of 575 nm. The quality function 42 varies between 0 and 1.0 indicates a donut-shaped light intensity distribution having a zero point at the center of the focal area 16, which requires that the beam shaping device 18 is effective as a segmented λ/2 waveplate 1 indicates that a spot or intensity maximum is formed at the center of the focal area, which requires that the beam shaping device 18 does not essentially affect the polarization distribution of the incident light. In addition to the quality function 42 itself, a 500-fold magnification of the quality function is displayed at 43. The value of zero of the quality function is achieved at 775 nm. Further, it is nearly achieved at about 565 nm and 455 nm. Between these wavelengths, there are extended ranges 44 over which the beam shaping device 18 is affecting the polarization distribution of the incident light by less than 20% so that these ranges 44 may be used for different wavelengths of the excitation light.

Figure 7:
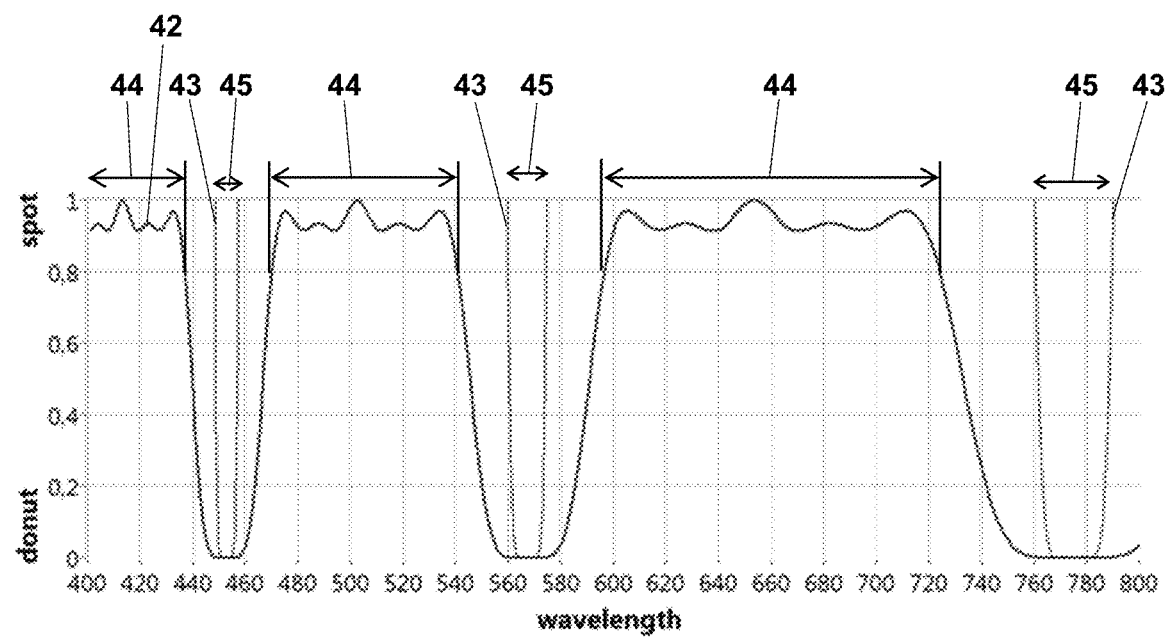
FIG. 7 shows a wide excitation range quality function of a further embodiment of the SBCBSD according to the present disclosure.

FIG. 7 shows a quality function 42 and its 500-fold magnification 43 for another embodiment of the beam shaping device 18. Here, the BCSs 22 to 25 each consist of four CBEs made of quartz which are 2.5λ, 7.5λ, 10λ and 2.5λ waveplates at 775 nm with their fast axes being arranged at absolute angles of 0°, 35°, −40° and −104°. This results in broadened wavelength ranges 45 over which the wavelength of the fluorescence inhibition light may be varied without losing the zero point at the center of the focal area 16. This may, for example, be a big advantage, if the wavelength of the fluorescence inhibition light cannot be kept within a very small bandwidth. This may particularly be the case if the fluorescence inhibition light is provided in very short time high power pulses.

Figure 8:
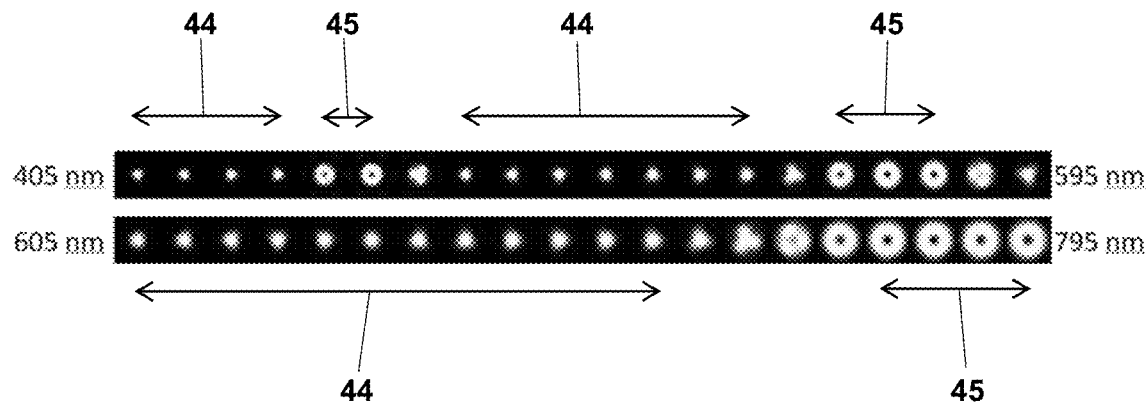
FIG. 8 shows the shape of an intensity distribution of light from the light sources focused by the objective lens of the RESOLFT microscope according to FIG. 1 depending on the wavelength of the light in case of the embodiment of the SBCBSD having the quality function of FIG. 7.

FIG. 8 depicts the point spread function of the beam shaping device 18 and the objective lens 15 in case of the quality function 42 according to FIG. 7 realized with six BCSs arranged as three pairs of BCSs which oppose each other across the optical axis 32 and have orthogonal effective fast axes. The point spread function is depicted for different wavelengths from 405 nm to 795 nm in steps of 10 nm. FIG. 8 clearly shows both the extended ranges 44 over which the focused light is spot-shaped and the extended ranges 45 over which the intensity distribution of the focused light is donut-shaped. Over the extended ranges 45 the donuts of the intensity distribution of the focused light are nearly exactly round. With only four BCSs, the peripheries of the donuts would show a deformation towards a square in the wavelength ranges 45.

Figure 9:
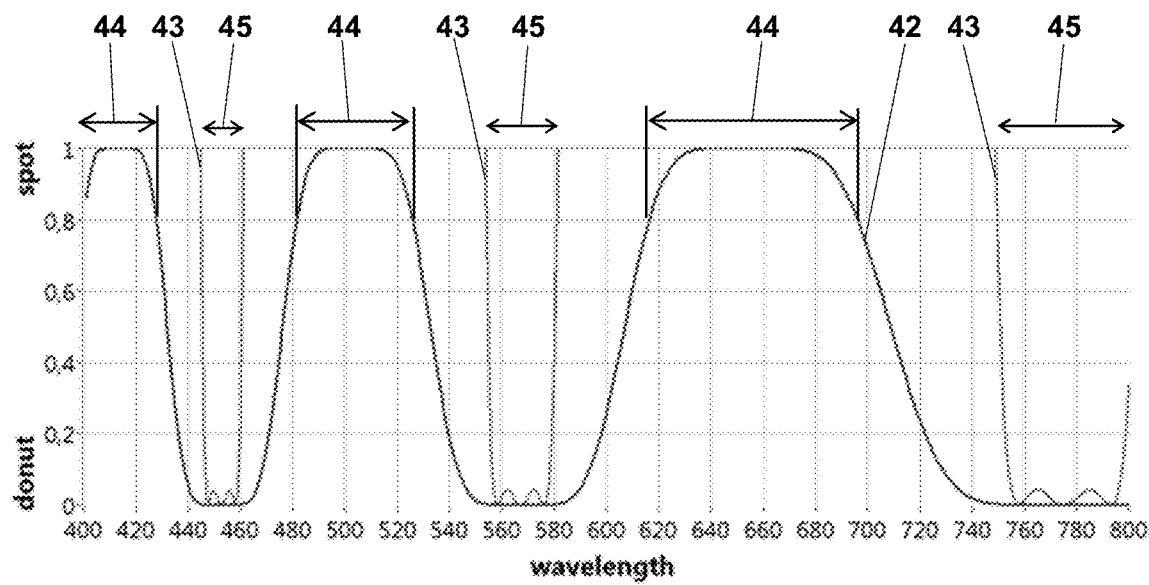
FIG. 9 shows a wide excitation range quality function of a further embodiment of the SBCBSD according to the to the present disclosure.

FIG. 9 shows a quality function of a further embodiment of the beam shaping device 18. Here, the BCEs made of quartz are 2.5λ, 5λ and 5λ waveplates at 575 nm with their fast axes being oriented at angles of 0°, 51° and −54°. The result is a very small variation of the quality factor over both the wavelength ranges 44 and the wavelength ranges 45. I.e. the quality factor nearly constantly stays at 1 or 0 over the wavelength ranges 44 and 45, respectively.

Figure 10:
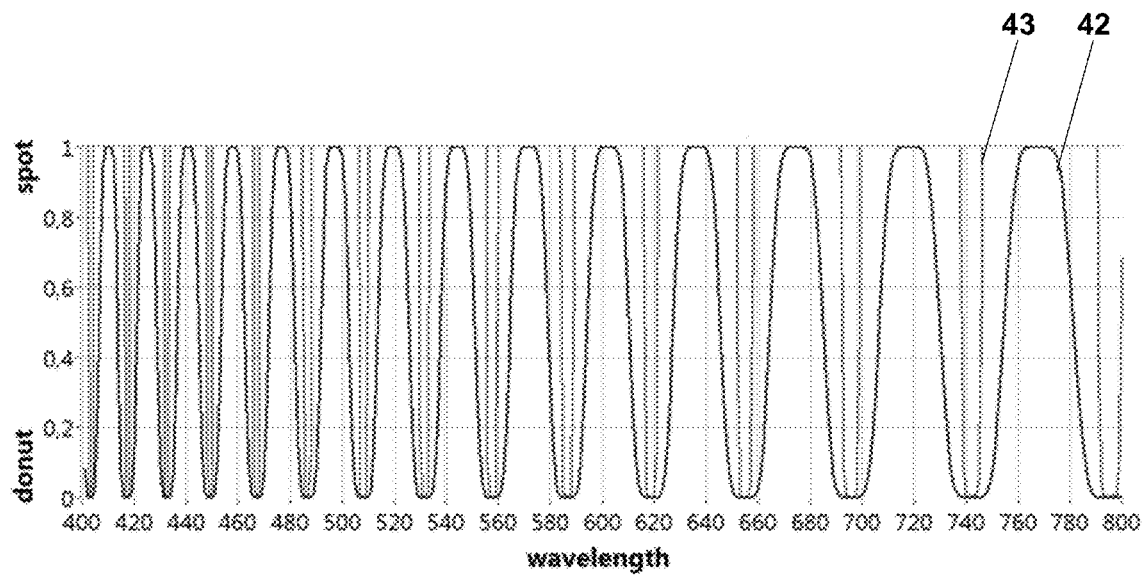
FIG. 10 shows a wide excitation range quality function of yet another embodiment of the SBCBSD according to the to the present disclosure.

FIG. 10 shows a quality function of basically the same embodiment of the beam shaping device 18 as in FIG. 9 but with a design wavelength of the fluorescence inhibition light of 3,726 nm and with CBEs made of MgF. The quality function indicates the applicability of the present disclosure over an overall wavelength range extending from a few hundred nanometers to a few thousand nanometers.

Figure 11:
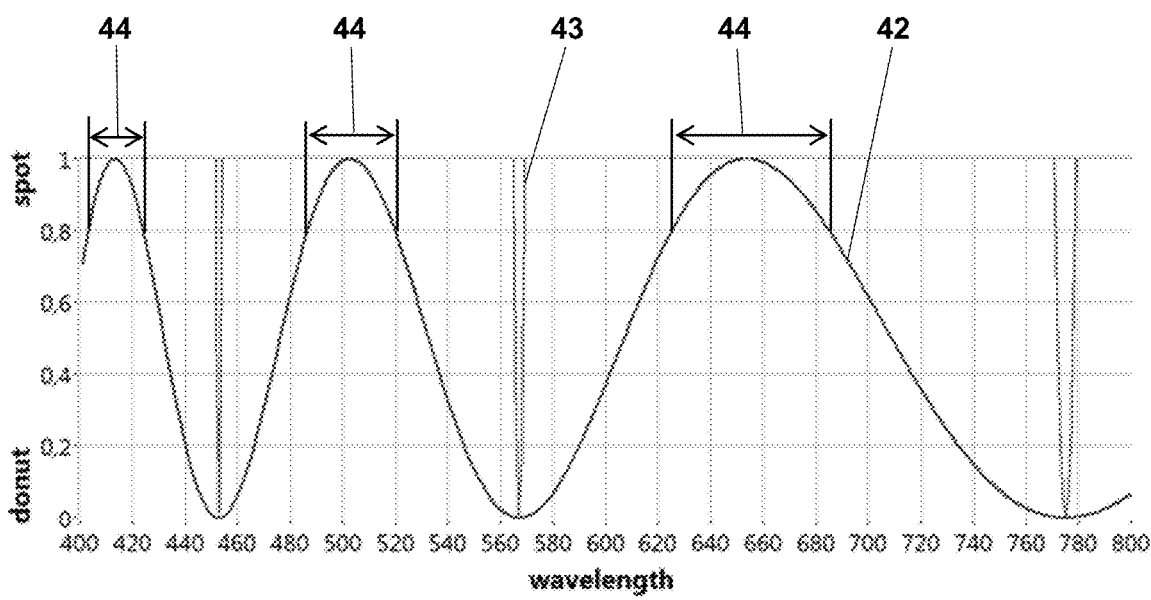
FIG. 11 shows a wide excitation range quality function of a SBCBSD according to the prior art.

FIG. 11 depicts the quality function of a prior art segmented birefringent chromatic beam shaping device only having one CBE per BCS 22 to 25 according to FIG. 2. Here, the wavelength ranges 44 are both narrow and far away from the wavelengths at which the BCSs are effective λ/2 waveplates to provide the zero point of the intensity distribution of the fluorescence inhibition light at the center of the focal area 16.

Many variations and modifications may be made to the preferred embodiments of the invention without departing substantially from the spirit and principles of the invention. All such modifications and variations are intended to be included herein within the scope of the present invention, as defined by the following claims.

I claim:
1. A segmented birefringent chromatic beam shaping device comprising
   a pupil and
   at least three birefringent chromatic segments arranged side by side in the pupil, wherein birefringent and chromatic properties of the beam shaping device are invariant over each birefringent chromatic segment of the at least three birefringent chromatic segments, wherein the at least three birefringent chromatic segments are $(n+s)\lambda$ waveplates at a first design wavelength, n being an integer greater than 0, and s being in a range from −0.1 to 0.1, wherein n is identical or not identical with all of the at least three birefringent chromatic segments, wherein at least two of the at least three birefringent chromatic segments are $(m+r)\lambda$ waveplates at a second design wavelength, m being an integer greater than 0, and r being in a range from 0.4 to 0.6, wherein the at least two of the at least three birefringent chromatic segments only differ in orientations of their effective fast axes in the pupil, wherein each of the at least three birefringent chromatic segments comprises a stack of birefringent elements including at least three chromatic birefringent elements, wherein orientations of fast axes of each pair of directly consecutive chromatic birefringent elements of the at least three chromatic birefringent elements of each of the at least three birefringent chromatic segments differ by at least 5 deg, and wherein all of the at least two of the at least three birefringent chromatic segments comprise same sequences of materials, thicknesses and orientations of their birefringent elements.

2. The beam shaping device of claim 1,
wherein the at least three birefringent chromatic segments are at least four birefringent chromatic segments and include at least two pairs of birefringent chromatic segments, wherein the two birefringent chromatic segments of each of the at least two pairs of birefringent chromatic segments comprise same sequences of materials, thicknesses and orientations of their at least three chromatic birefringent elements, and wherein the two birefringent chromatic segments of each of the at least two pairs of birefringent chromatic segments are located on opposite sides of a center of the pupil.

3. The beam shaping device of claim 2, wherein a total number of the at least three birefringent chromatic segments is an even number.

4. The beam shaping device of claim 3, wherein the total number of the at least three birefringent chromatic segments is six.

5. The beam shaping device of claim 1, wherein the at least three birefringent chromatic segments are evenly distributed around a center of the pupil.

6. The beam shaping device of claim 1, wherein the at least three birefringent chromatic segments are pie segments tapering towards the center of the pupil.

7. The beam shaping device of claim 1, wherein all of the at least three birefringent chromatic segments comprise same sequences of materials, thicknesses and orientations of their birefringent elements.

8. The beam shaping device of claim 1, wherein all segments are $(m+r)\lambda$ waveplates at the second design wavelength.

9. The beam shaping device of claim 1, wherein the orientations of the effective fast axes of the $(m+r)\lambda$ waveplates at the second design wavelength rotate from segment to segment at an opposite sense of rotation as compared to a sense of rotation at which the respective birefringent chromatic segments are arranged around a center of the pupil.

10. The beam shaping device of claim 1, wherein the at least two birefringent chromatic segments of the at least three birefringent chromatic segments are located on opposite sides of a center of the pupil, and wherein effective fast axes, which the at least two birefringent chromatic segments of the at least three birefringent chromatic segments display as the $(m+r)\lambda$ waveplates at the second design wavelength, are orthogonal to each other.

11. The beam shaping device of claim 1, wherein the at least three chromatic birefringent elements of each of the at least three birefringent chromatic segments are selected from $t\lambda$ and $(t+1/2)\lambda$ waveplates at the second design wavelength, t being an integer, wherein t is identical or not identical in all of the at least three chromatic birefringent elements.

12. The beam shaping device of claim 1, wherein the differences of orientations of fast axes of each pair of directly consecutive chromatic birefringent elements of the at least three chromatic birefringent elements of each of the at least three birefringent chromatic segments are at least 10 deg.

13. The beam shaping device of claim 1, wherein all the birefringent elements of each of the at least three chromatic birefringent elements have a thickness in a range from 0.1 mm to 25 mm.

14. The beam shaping device of claim 1, wherein three of the birefringent elements of each of the at least three birefringent chromatic segments are made of the same material and have the same thicknesses.

15. The beam shaping device of claim 1, wherein each of the at least three birefringent chromatic segments consists of three chromatic $2.5\lambda$ waveplates at the second design wavelength, a fast axis of a second one of the three chromatic $2.5\lambda$ waveplates being oriented at an angle of 45° to a fast axis of a first one of the three chromatic $2.5\lambda$ waveplates, and a fast axis of a third one of the three chromatic $2.5\lambda$ waveplates being oriented at an angle of 90° to the fast axis of the first one of the three chromatic $2.5\lambda$ waveplates when viewing onto the pupil.

16. The beam shaping device of claim 1, wherein the at least three chromatic birefringent elements of each of the at least three birefringent chromatic segments provide a $p\lambda$ waveplate at the second design wavelength, wherein each of the at least three birefringent chromatic segments comprises a further achromatic $(q+1/2)\lambda$ waveplate, p and q being integers.

17. The beam shaping device of claim 16, wherein, the at least three birefringent chromatic segments consist of
three chromatic $2\lambda$ waveplates at the second design wavelength, a fast axis of a second one of the three chromatic $2\lambda$ waveplates being oriented at an angle of 45° to a fast axis of a first one of the three chromatic $2\lambda$, waveplates, and a fast axis of a third one of the three chromatic $2\lambda$, waveplates being oriented at an angle of 0° to the fast axis of the first one of the three chromatic $2\lambda$, waveplates when viewing onto the pupil, and
an achromatic $\lambda/2$ waveplate.

18. The beam shaping device of claim 1, wherein the at least three birefringent chromatic segments are $(n+x)\lambda$ waveplates in a wavelength range including the first design wavelength, x being in a range from −0.2 to 0.2, and the wavelength range extending over at least 10% of the first design wavelength.

19. The beam shaping device of claim 1, wherein the first design wavelength and the second design wavelength, differ by not more than 15% of the first design wavelength.

* * * * *